US010507876B2

(12) United States Patent
Curtis (10) Patent No.: US 10,507,876 B2
(45) Date of Patent: Dec. 17, 2019

(54) AERODYNAMICALLY OPTIMIZED VEHICLE SIDE MIRROR

(71) Applicants: Hyundai Motor Company, Seoul (KR); Kia Motors Corporation, Seoul (KR)

(72) Inventor: David W. Curtis, South Lyon, MI (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 98 days.

(21) Appl. No.: 15/841,496

(22) Filed: Dec. 14, 2017

(65) Prior Publication Data

US 2019/0185076 A1 Jun. 20, 2019

(51) Int. Cl.
*B62D 35/00* (2006.01)
*B60R 1/06* (2006.01)

(52) U.S. Cl.
CPC .............. *B62D 35/008* (2013.01); *B60R 1/06* (2013.01)

(58) Field of Classification Search
CPC ......... B60R 1/06; B60R 1/006; B62D 35/008; Y02T 10/82
USPC .......................................... 296/1.11; 359/871
See application file for complete search history.

(56) References Cited

U.S. PATENT DOCUMENTS

| 2,796,506 | A | * | 6/1957 | Lumbert | ............... | B60R 1/0602 |
| | | | | | | 219/219 |
| 3,059,540 | A | * | 10/1962 | Robinson | ............. | B60R 1/0602 |
| | | | | | | 296/91 |
| 4,898,458 | A | | 2/1990 | McDonald | | |
| 5,179,470 | A | | 1/1993 | Olson | | |
| 5,903,389 | A | * | 5/1999 | Rumez | ...................... | B60R 1/06 |
| | | | | | | 359/507 |
| 6,290,361 | B1 | * | 9/2001 | Berzin | .................. | B60R 1/0602 |
| | | | | | | 15/250.003 |
| 8,955,236 | B2 | * | 2/2015 | Keyes | ................... | B60R 1/0602 |
| | | | | | | 34/181 |
| 9,211,839 | B2 | | 12/2015 | Zha | | |
| 9,216,779 | B2 | * | 12/2015 | Zha | .......................... | B60R 1/06 |
| 9,676,427 | B2 | * | 6/2017 | Zha | ....................... | B62D 35/00 |

FOREIGN PATENT DOCUMENTS

| CN | 102381253 | A | * | 3/2012 | | |
| GB | 2058695 | A | * | 4/1981 | ........... | B60R 1/0602 |
| GB | 2468289 | A | * | 9/2010 | ........... | B60R 1/0602 |
| KR | 20-0391955 | Y1 | | 8/2005 | | |
| KR | 10-0702787 | B1 | | 3/2007 | | |
| WO | WO-2014126610 | A1 | * | 8/2014 | ............. | B62D 35/00 |

* cited by examiner

*Primary Examiner* — Hilary L Gutman
(74) *Attorney, Agent, or Firm* — Mintz Levin Cohn Ferris Glovsky and Popeo, P.C.; Peter F. Corless (57) ABSTRACT

A vehicle side mirror includes: a mirror assembly including a mirror facing a rearward direction; a housing having a rearward-facing opening defining an interior space which receives at least a portion of the mirror assembly, exposing the mirror assembly from the rearward direction; a cap covering a front portion of the housing, the cap having an inlet formed therethrough; and a shroud disposed between the cap and the housing that is configured to direct air passing through the inlet around the mirror assembly to an outlet defined by an opening between a rear end of the cap and a rear end of the shroud.

16 Claims, 6 Drawing Sheets

RELATED ART

RELATED ART

AERODYNAMICALLY OPTIMIZED VEHICLE SIDE MIRROR

TECHNICAL FIELD

The present disclosure relates generally to vehicular technologies, and more particularly, to an aerodynamically optimized vehicle side mirror.

BACKGROUND

For years, vehicles have been manufactured with side mirrors extending outwardly from the side of the vehicle, such as a front area of the driver-side and passenger-side doors, for the purpose of assisting the driver's ability to view surrounding objects. These mirrors, problematically, create increased drag on the vehicle due to their size and shape. This increased drag makes the vehicle less aerodynamic, and thus increases fuel consumption and decreases fuel economy.

SUMMARY

The present disclosure provides a side mirror for a vehicle having improved aerodynamics by routing airflow through the side mirror and around the mirror glass. An inlet is formed on a front side of the mirror (referred to herein as a "cap"), while an outlet is formed at a rear end of the mirror. An airflow duct, which connects the inlet and the outlet, is formed between an interior surface of the cap and an exterior surface of a shroud disposed between the housing and the mirror assembly. Airflow entering the inlet travels through the airflow duct around the mirror assembly to the outlet, thus reducing drag on the vehicle. The outlet can direct the air exiting the outlet radially inward toward a center of the mirror assembly such that zones of turbulence are generated immediately adjacent to a rear surface of the mirror assembly. Moreover, the inlet and outlet may be formed such that a ratio of surface area of the inlet to surface area of the outlet is approximately 1:1. Overall vehicle aerodynamics and fuel efficiency are improved as a result.

According to embodiments of the present disclosure, a vehicle side mirror includes: a mirror assembly including a mirror facing a rearward direction; a housing having a rearward-facing opening defining an interior space which receives at least a portion of the mirror assembly, exposing the mirror assembly from the rearward direction; a cap covering a front portion of the housing, the cap having an inlet formed therethrough; and a shroud disposed between the cap and the housing that is configured to direct air passing through the inlet around the mirror assembly to an outlet defined by an opening between a rear end of the cap and a rear end of the shroud.

The outlet may direct air exiting the outlet radially inward toward a center of the mirror assembly. Also, the inlet and the outlet may be formed such that a ratio of surface area of the inlet to surface area of the outlet is approximately 1:1.

The inlet may be positioned upwardly and outwardly of a pivot of the mirror assembly. In addition, the inlet may be positioned on a high-pressure area of the cap. A shape of the inlet may correspond to a shape of a high-pressure area of the cap. Similarly, a size of the inlet may correspond to a size of a high-pressure area of the cap.

A plurality of inlet walls of the inlet may be formed to be substantially parallel with an airflow direction of a vehicle on which the vehicle side mirror is mounted. The plurality of inlet walls may be segmented by a plurality of openings.

The surface area of the inlet can be approximately equal to the surface area of the outlet.

An angle between a direction of airflow entering the inlet and a direction of airflow exiting the outlet may be between 10° and 35°. Similarly, the inlet may define a central axis corresponding to a direction of airflow entering the inlet, and the outlet may direct the air exiting the outlet at an angle between 10° and 35° relative to the central axis.

An airflow duct may be disposed between the inlet and the outlet and formed between an exterior surface of the shroud and an interior surface of the cap. The inlet, the airflow duct, and the outlet, in order, may define a path of airflow moving through the vehicle side mirror.

The outlet can direct air exiting the outlet radially inward toward the center of the mirror assembly such that zones of turbulence are generated immediately adjacent to a rear surface of the mirror assembly.

Moreover, the housing and the shroud may be separately formed, or the housing and the shroud may be integrally formed.

Also, the cap may include a first cap portion having a cutout formed therein and a second cap portion including the inlet, the cutout of the first cap portion formed so as to receive the inlet included in the second cap portion.

BRIEF DESCRIPTION OF THE DRAWINGS

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Figure 1A:
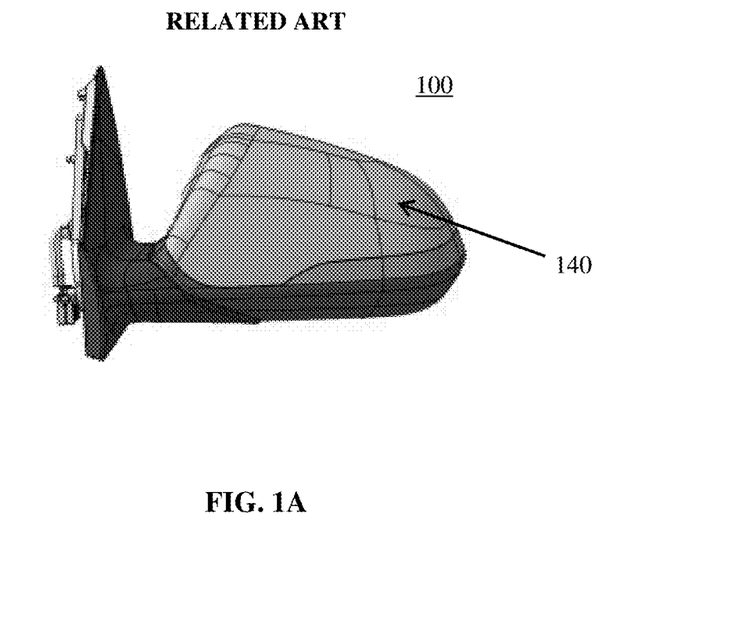
FIGS. 1A and 1B are front perspective views of a conventional vehicle side mirror and a vehicle side mirror according to embodiments of the present disclosure, respectively.

Referring now to embodiments of the present disclosure, the disclosed vehicle side mirror is designed to route airflow through the side mirror and around the mirror glass, thereby reducing drag caused by the mirror and improving vehicle aerodynamics Conventional vehicle side mirrors, such as side mirror 100 shown in FIG. 1A, cause increased drag on the vehicle to which the mirror is mounted due to its size and shape. In turn, the vehicle is less aerodynamic and consumes fuel at a greater rate.

Figure 1B:
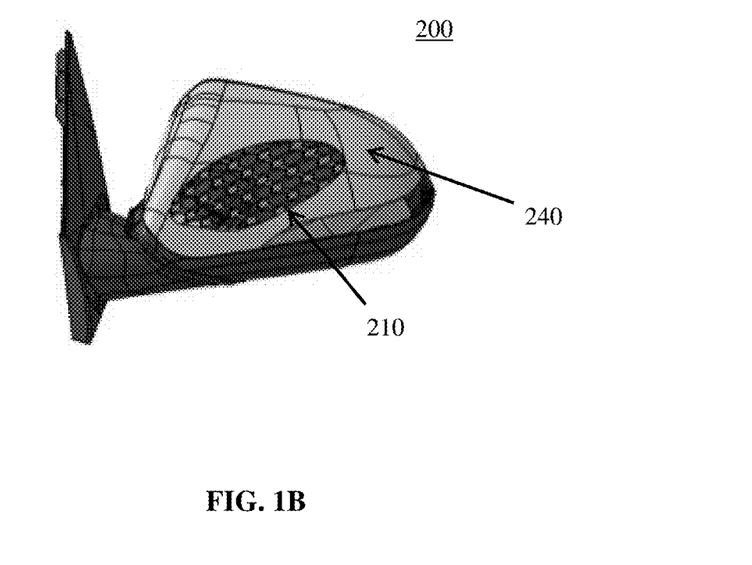

To remedy the shortcomings of conventional side mirrors, a vehicle side mirror according to embodiments of the present disclosure, such as side mirror 200 shown in FIG. 1B, features an inlet 210 formed on a front side of the side mirror (referred to herein as a cap 240) and an outlet 220 formed at a rear end of the mirror. An airflow duct 230 connects the inlet 210 and the outlet 220. The airflow duct 230, as described in greater detail below, may be formed between an interior surface of the cap 240 and an exterior surface of a shroud 270 disposed between the cap 240 and a housing 280. Airflow entering the inlet 210 can travel through the airflow duct 230 around the mirror assembly 250 to the outlet 220, thus reducing drag on the vehicle (not shown). Overall vehicle aerodynamics and fuel efficiency are improved as a result.

Figure 2:
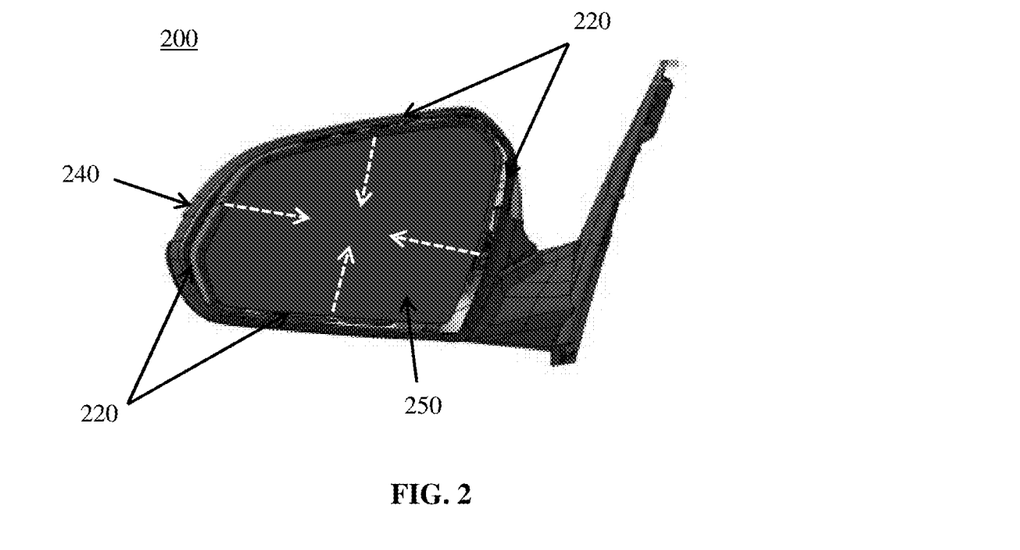
FIG. 2 is a rear perspective view of a vehicle side mirror having an airflow outlet formed therein according to embodiments of the present disclosure.

FIG. 2 is a rear perspective view of a vehicle side mirror 200 having an airflow outlet 220 formed therein according to embodiments of the present disclosure. As shown in FIG. 2, a cap 240 may cover a front portion of the housing 280 which has a rearward-facing opening that defines an interior space receiving at least a portion of the mirror assembly 250. Because the housing 280 is at least partially covered by the cap 240, the housing 280 is not readily visible in FIG. 2, but shown in greater detail in FIG. 6B. The mirror assembly 250 includes a mirror facing a rearward direction, and the mirror assembly may be disposed within the cap 240 and the housing 280 so as to expose the mirror assembly 250 from the rearward direction.

Figure 8:
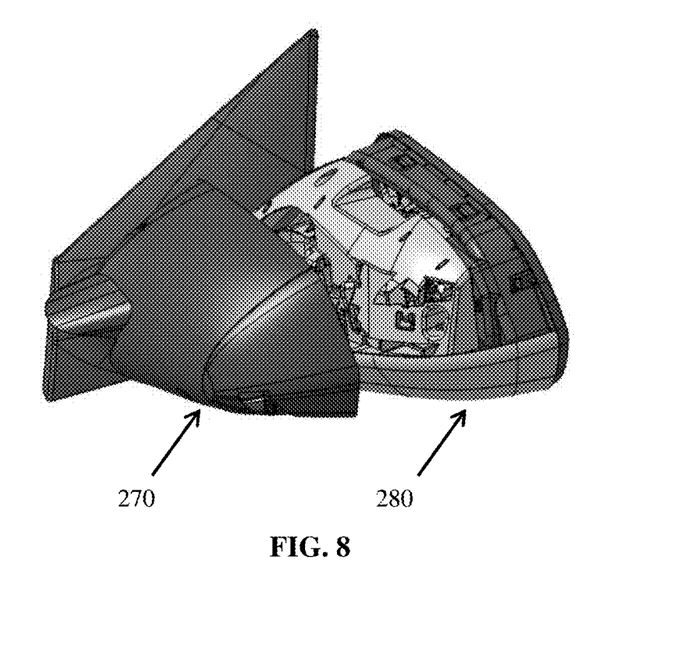
FIG. 8 is a perspective view of a shroud and housing of a vehicle side mirror according to embodiments of the present disclosure.

The outlet 220 may be positioned along a circumference of the mirror assembly 250 (either a portion thereof or an entirety thereof), such that airflow entering the inlet 210 passes around the mirror assembly 250 before exiting the outlet 220. In greater detail, the outlet 220 may be defined by an opening between a rear end of a shroud 270 and a rear end of the cap 240. The shroud 270, which is shown in FIGS. 6B and 8 (but not readily visible in FIG. 2), may be disposed between the cap 240 and the mirror assembly 250, and more specifically, between the cap 240 and the housing 280 which receives the mirror assembly 250. The shroud 270 may direct the air which passes through the inlet 210 around the mirror assembly 250 to the outlet 220.

Figure 5A:
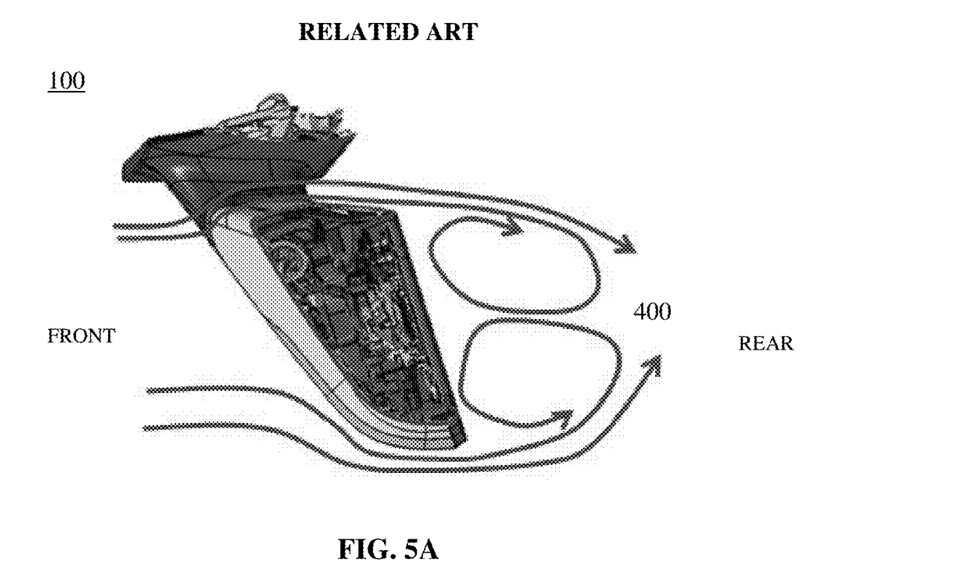
FIGS. 5A and 5B are side cross-sectional views of a conventional side mirror and a vehicle side mirror according to embodiments of the present disclosure, respectively.
Figure 5B:
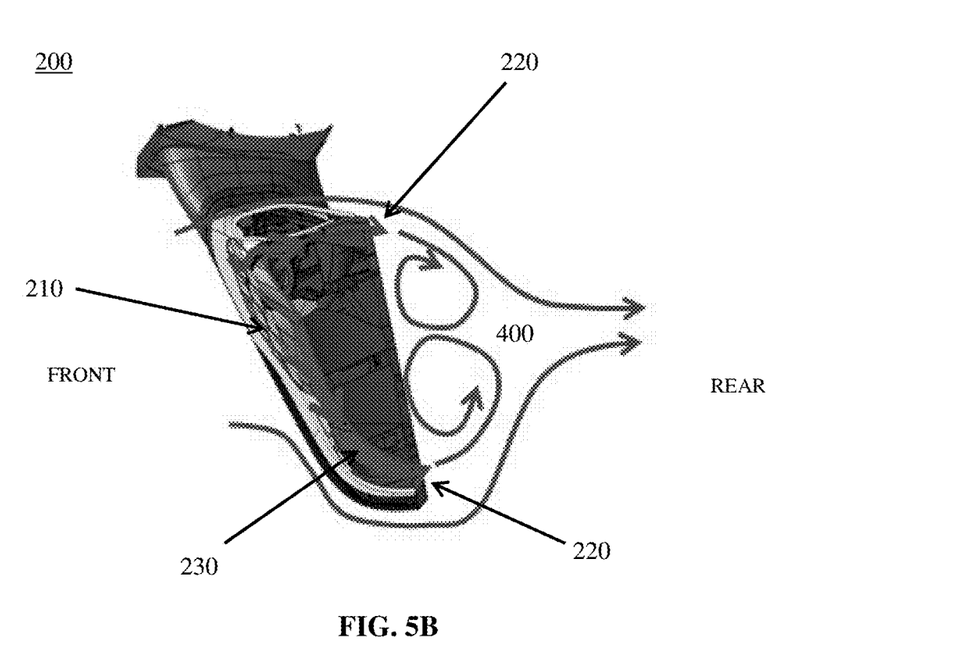

As further shown in FIG. 2, the outlet 220 may direct air exiting the outlet 220 (represented by dashed lines in FIG. 2) radially inward toward a center of the mirror assembly 250. By directing the airflow inwardly, zones of turbulence are generated immediately adjacent to a rear surface of the mirror assembly 250, and the resultant wake behind the mirror 200 can be reduced. Conventional vehicle side mirrors typically suffer from a larger wake 400 behind the mirror, as shown in FIG. 5A, which increases aerodynamic drag. In contrast, the vehicle side mirror 200 can reduce its wake 400 and improve airflow behind the mirror 200 by routing airflow through the mirror 200 and radially inward toward a center of the mirror assembly 250, as shown in FIG. 5B. The aerodynamic benefits of a more streamlined wake 400 behind the side mirror 200, as opposed to the conventional side mirror 100, include reduced drag and, therefore, greater fuel economy.

The inlet 210 and outlet 220 may be formed such that a ratio of surface area of the inlet 210 to surface area of the outlet 220 is approximately 1:1. That is, the surface area of the inlet 210 can be approximately equal to the surface area of the outlet 220. The effect of an approximate 1:1 surface area ratio is optimal airflow through the mirror 200 and greater reduction of drag, as opposed to an inlet that is larger than the outlet or an outlet that is smaller than the inlet.

Figure 3:
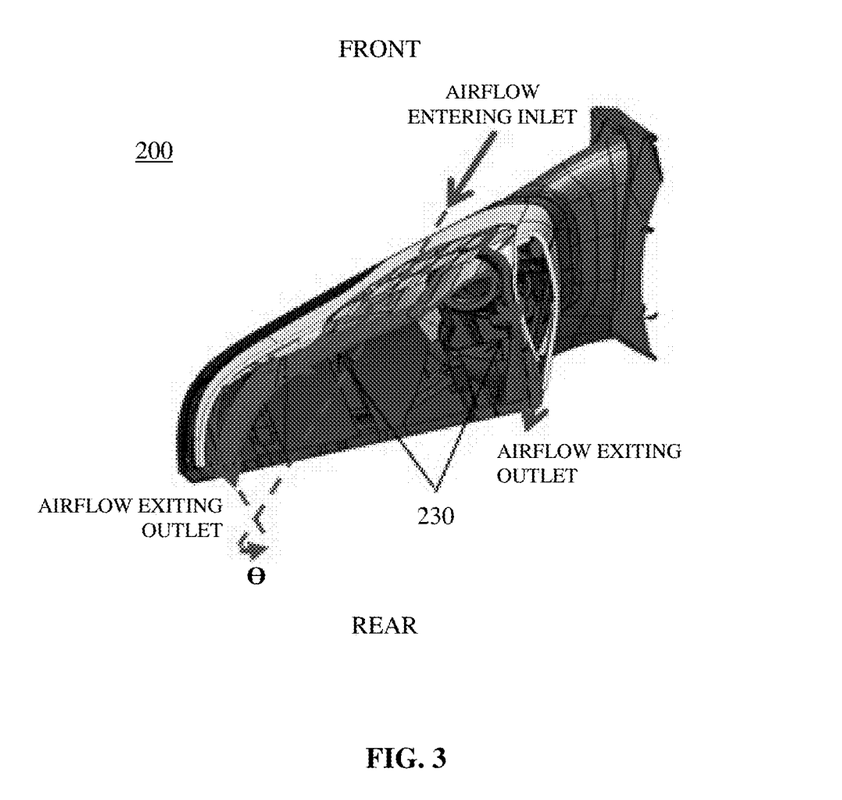
FIG. 3 is a top cross-sectional view of a vehicle side mirror having an airflow inlet, outlet, and duct formed therein according to embodiments of the present disclosure.

FIG. 3 is a top cross-sectional view of a vehicle side mirror 200 having an airflow inlet 210, outlet 220, and duct 230 formed therein according to embodiments of the present disclosure. As shown in FIG. 3, an airflow duct 230 may be an area disposed between the inlet 210 and the outlet 220. The duct 230 can be formed between the cap 240 and the mirror assembly 250. When the vehicle is moving in a forward direction, airflow may enter the inlet 210, travel through the duct 230, and eventually exit the outlet 220. Thus, a path of airflow moving through the side mirror may be defined by, in order, the inlet 210, the airflow duct 230, and the outlet 220. The path of airflow around the mirror assembly enables the ratio of surface area of the inlet 210 to surface area of the outlet 220 to be approximately 1:1, as mentioned above.

The design of the shroud 270 may dictate the path of airflow. The shroud 270, shown in greater detail by FIGS. 6B and 8, can direct the airflow from the inlet 210, around the mirror assembly 250, to the outlet 220. Thus, the duct 230 can be formed as the area between the cap 240 and the shroud 270, that is, between an interior surface of the cap 240 and an exterior surface of the shroud 270.

The outlet 220 may direct air exiting the outlet 220 radially inward toward a center of the mirror assembly 250, as explained above. In this regard, the angle between a direction of airflow entering the inlet 210 and a direction of airflow exiting the outlet 220 may be between 10° and 35°, or more particularly, between 18° and 28°. Put another way, the outlet 220 can direct the air exiting the outlet 220 at an angle between 10° and 35°, or more particularly, between 18° and 28°, relative to a central axis corresponding to a direction of airflow entering the inlet 210. It should be noted that the angular offset (θ) may be adjusted and optimized based on the particular vehicle on which the side mirror 200 is mounted.

Figure 4A:
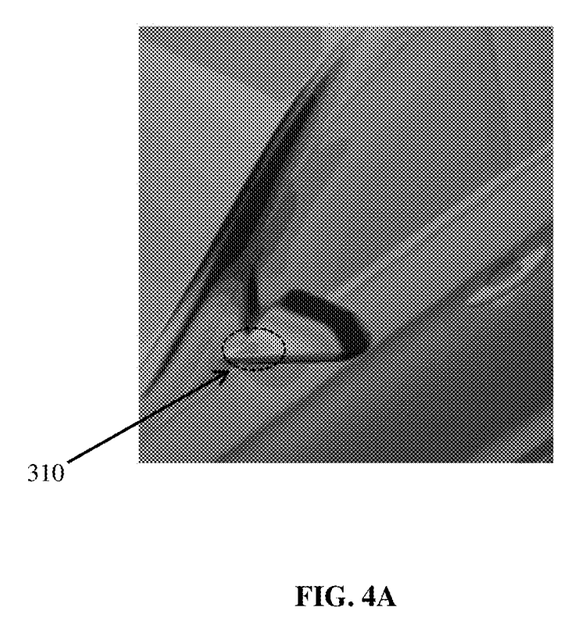
FIGS. 4A and 4B are perspective views illustrating the position, shape, and size of an airflow inlet formed in a vehicle side mirror according to embodiments of the present disclosure.

FIGS. 4A and 4B are perspective views illustrating the position, shape, and size of an airflow inlet 210 formed in a vehicle side mirror 200 according to embodiments of the present disclosure. As shown in FIG. 4A, a high-pressure area 310 of the cap 240 caused by airflow exerted on the side mirror 200 while the vehicle is moving. In order to optimize airflow through the mirror 200, the inlet 210 may be positioned on the high-pressure area 310. Moreover, the shape of the inlet 210 may correspond to the shape of the high-pressure area 310, and the size of the inlet 210 may correspond to the size of the high-pressure area 310.

Figure 4B:
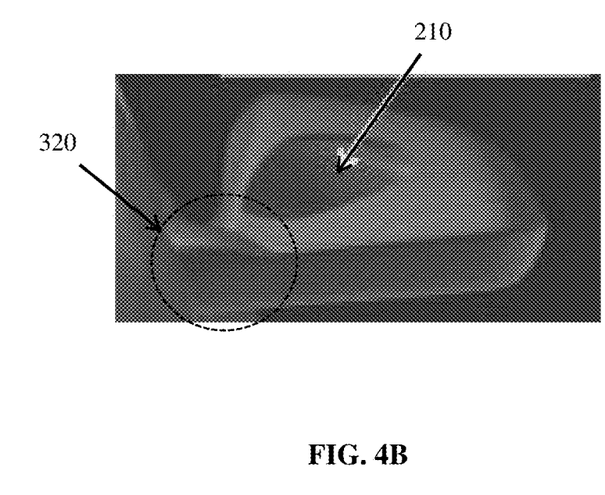

The positioning of the inlet 210 may depend on the pivot 320 of the side mirror. For instance, the inlet 210 may be positioned upwardly and outwardly of the 320 pivot, as shown in FIG. 4B. Also, the inlet 210 may be formed to be inline, i.e., parallel, with the airflow direction on the vehicle, as described in greater detail below.

Figure 6A:
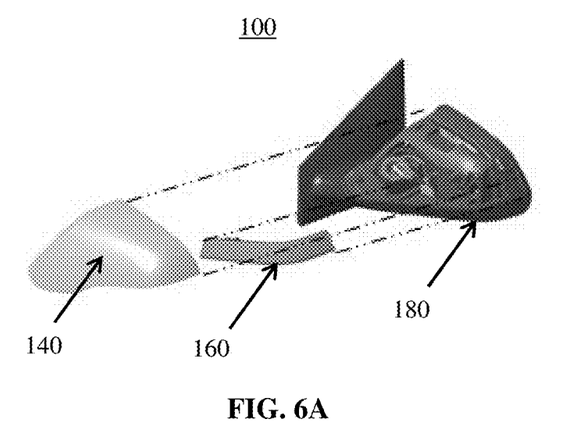
FIGS. 6A and 6B are exploded views of a conventional vehicle side mirror and a vehicle side mirror according to embodiments of the present disclosure, respectively.
Figure 6B:
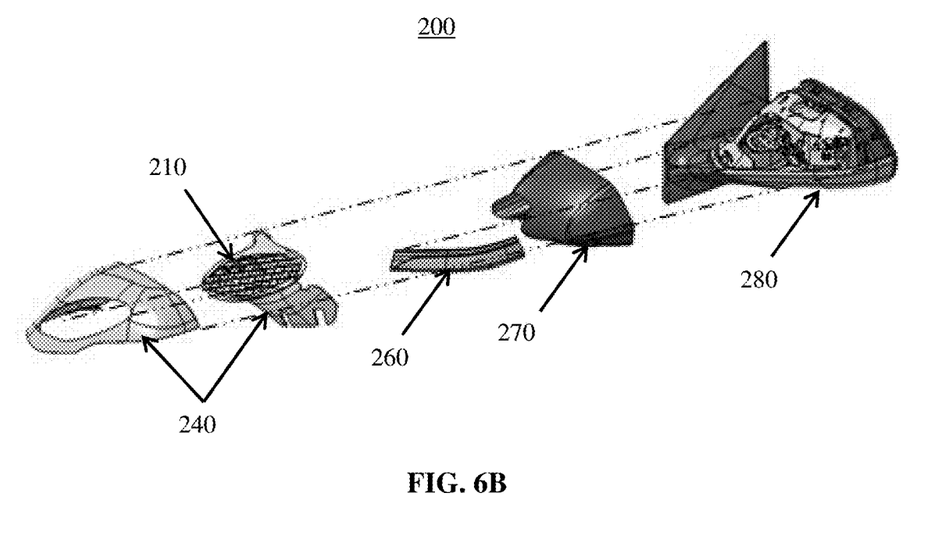

FIGS. 6A and 6B are exploded views of a conventional vehicle side mirror and a vehicle side mirror 200 according to embodiments of the present disclosure, respectively. As shown in FIG. 6A, a conventional vehicle side mirror 100 may include, for example, a cap 140 covering a front portion of the housing 180, in which the mirror assembly is disposed. In some cases, a turn signal light 160 can be integrated in the mirror 100 to signify that the vehicle is turning.

Conversely, as shown in FIG. 6B, the vehicle side mirror 200 may include a cap 240 having an inlet 210 formed therein, a housing 280 at least partially encompassing a mirror assembly 250, and a shroud 270 disposed between the cap 240 and the housing 280 that is configured to direct air passing through the inlet 210 around the mirror assembly 250 to an outlet 220 defined by an opening between a rear end of the shroud 270 and a rear end of the cap 240. In some cases, a turn signal light 260 can be integrated in the mirror 200 to signify that the vehicle is turning.

Figure 7:
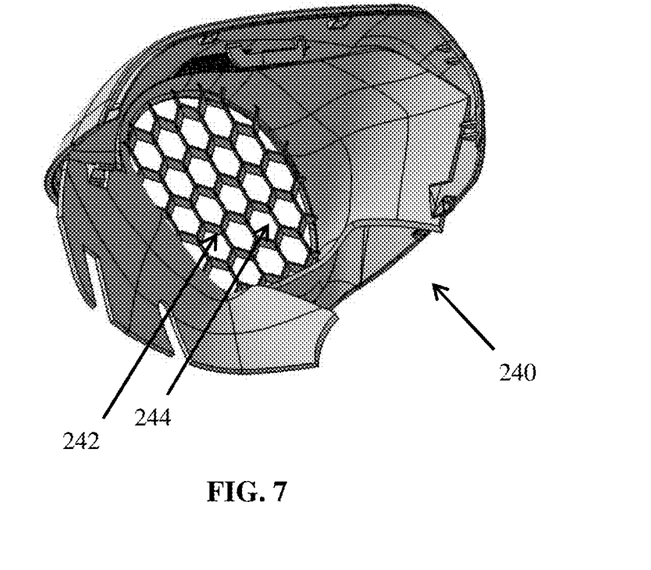
FIG. 7 is a perspective view of a cap of a vehicle side mirror according to embodiments of the present disclosure.

The cap 240 can direct airflow from the inlet 210 around the shroud 270. In further detail, FIG. 7 is a perspective view of a cap 240 of a vehicle side mirror 200 according to embodiments of the present disclosure. As shown in FIG. 7, the inlet 210 may include a plurality of openings 244 segmented by a plurality of inlet walls 242. In some cases, the plurality of inlet walls 242 may be arranged in a honeycomb-like structure, such as the arrangement depicted in FIG. 7. The plurality of inlet walls 242 may arranged according to any shape, style, or arrangement, however, such that the ratio of surface area of the inlet 210 to surface area of the outlet 220 is approximately 1:1.

Additionally, the plurality of inlet walls 242 may be formed to follow the airflow direction of the vehicle on which the vehicle side mirror 200 is mounted to optimize the flow of air entering the inlet 210. That is, that is plurality of inlet walls 242 may be formed to be substantially parallel (or inline) with the airflow direction of the vehicle. The airflow direction may refer to the direction of airflow around or off of the vehicle and onto the mirror front surface while the vehicle is in motion. The airflow direction may differ depending on the vehicle's design, as would be understood by a person possessing an ordinary level of skill in the art. Forming the inlet 210 such that the angle of the inlet walls 242 follows the airflow direction reduces the wake behind the mirror 200 when the vehicle is in motion.

The cap 240 may be formed as a single, integral piece, similar to a conventional mirror cap 140, so as to cover a front portion of the housing 280, but with the inlet 210 formed therein. In some cases, the cap 240 may be formed in multiple pieces. For example, the cap 240 may include a first cap portion having a cutout formed therein and a second cap portion including the inlet 210 (i.e., the inlet portion). The cutout of the first cap portion can be formed so as to receive the inlet portion included in the second cap portion such that the inlet 210 is inserted into the cutout, as demonstrated in FIG. 6B.

FIG. 8 is a perspective view of a shroud 270 and housing 280 of a vehicle side mirror 200 according to embodiments of the present disclosure. As shown in FIG. 8, the shroud 270 may be attached to the outside of the housing 280. The housing 280 and the shroud 270 may be separately formed, or alternatively, the housing 280 and the shroud 270 may be integrally formed (i.e., formed as a single piece).

The shroud 270, as mentioned above, can direct the airflow which enters the inlet 210 around the housing 280 and mirror assembly 250 toward the outlet 220. The shroud 270 and cap 240 may define the airflow duct 230, whereby an airflow pathway (i.e., duct) may be disposed between the exterior surface of the shroud 270 and the interior surface of the cap 240. An opening between the rear end of the shroud 270 and the rear end of the cap 240 may define the outlet 220 where the airflow exits the mirror 200.

Accordingly, the vehicle side mirror disclosed herein routes airflow through the side mirror and around the mirror glass to improve airflow around the vehicle and reduce wind noise for the vehicle occupants. By reducing drag and improving aerodynamics of the vehicle, overall fuel efficiency is increased in turn.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A vehicle side mirror comprising:
   a mirror assembly including a mirror facing a rearward direction;
   a housing having a rearward-facing opening defining an interior space which receives at least a portion of the mirror assembly, exposing the mirror assembly from the rearward direction;
   a cap covering a front portion of the housing, the cap having an inlet formed therethrough; and
   a shroud disposed between the cap and the housing that is configured to direct air passing through the inlet around the mirror assembly to an outlet defined by an opening between a rear end of the cap and a rear end of the shroud,
   wherein the outlet directs air exiting the outlet radially inward toward a center of the mirror assembly, and
   wherein a surface area of the inlet is approximately equal to a surface area of the outlet.

2. The vehicle side mirror of claim 1, wherein the inlet is positioned upwardly and outwardly of a pivot of the mirror assembly.

3. The vehicle side mirror of claim 1, wherein the inlet is positioned on a high-pressure area of the cap.

4. The vehicle side mirror of claim 1, wherein a shape of the inlet corresponds to a shape of a high-pressure area of the cap.

5. The vehicle side mirror of claim 1, wherein a size of the inlet corresponds to a size of a high-pressure area of the cap.

6. The vehicle side mirror of claim 1, wherein a plurality of inlet walls of the inlet are formed to be substantially parallel with an airflow direction of a vehicle on which the vehicle side mirror is mounted.

7. The vehicle side mirror of claim 1, wherein an angle between a direction of airflow entering the inlet and a direction of airflow exiting the outlet is between 10° and 35°.

8. The vehicle side mirror of claim 1, wherein the inlet includes a plurality of openings segmented by a plurality of inlet walls.

9. The vehicle side mirror of claim 1, wherein an airflow duct is disposed between the inlet and the outlet, the airflow duct formed between an exterior surface of the shroud and an interior surface of the cap.

10. The vehicle side mirror of claim 9, wherein the inlet, the airflow duct, and the outlet, in order, define a path of airflow moving through the vehicle side mirror.

11. The vehicle side mirror of claim 1, wherein the inlet defines a central axis corresponding to a direction of airflow entering the inlet, and the outlet directs the air exiting the outlet at an angle between 10° and 35° relative to the central axis.

12. The vehicle side mirror of claim 1, wherein the outlet directs air exiting the outlet radially inward toward the center of the mirror assembly such that zones of turbulence are generated immediately adjacent to a rear surface of the mirror assembly.

13. The vehicle side mirror of claim 1, wherein the housing and the shroud are separately formed.

14. The vehicle side mirror of claim 1, wherein the housing and the shroud are integrally formed.

15. The vehicle side mirror of claim 1, wherein the cap includes a first cap portion having a cutout formed therein and a second cap portion including the inlet, the cutout of the first cap portion formed so as to receive the inlet included in the second cap portion.

16. A vehicle side mirror comprising:
a mirror assembly including a mirror facing a rearward direction;
a housing having a rearward-facing opening defining an interior space which receives at least a portion of the mirror assembly, exposing the mirror assembly from the rearward direction;
a cap covering a front portion of the housing, the cap having an inlet formed therethrough; and
a shroud disposed between the cap and the housing that is configured to direct air passing through the inlet around the mirror assembly to an outlet defined by an opening between a rear end of the cap and a rear end of the shroud,
wherein a ratio of surface area of the inlet to surface area of the outlet is approximately 1:1.

* * * * *